United States Patent
Wust

(10) Patent No.: US 12,259,495 B2
(45) Date of Patent: Mar. 25, 2025

(54) SENSOR DEVICE FOR VEHICLES

(71) Applicant: 4Tek Pty Ltd, Yeppoon (AU)

(72) Inventor: Derel Wust, Yeppoon (AU)

(73) Assignee: 4Tek Pty Ltd, Yeppoon (AU)

( * ) Notice: Subject to any disclaimer, the term of this patent is extended or adjusted under 35 U.S.C. 154(b) by 60 days.

(21) Appl. No.: 17/577,311

(22) Filed: Jan. 17, 2022

(65) Prior Publication Data

US 2022/0236379 A1 Jul. 28, 2022

(51) Int. Cl.
*G01S 7/48* (2006.01)
*G01S 7/481* (2006.01)
*G01S 17/931* (2020.01)

(52) U.S. Cl.
CPC .......... *G01S 7/4808* (2013.01); *G01S 7/4816* (2013.01); *G01S 17/931* (2020.01); *B60Y 2400/90* (2013.01)

(58) Field of Classification Search
CPC .................................................. G01S 7/4808
See application file for complete search history.

(56) References Cited

U.S. PATENT DOCUMENTS

| | | | | |
|---|---|---|---|---|
| 9,646,428 | B1 * | 5/2017 | Konrardy | H04W 4/90 |
| 9,840,256 | B1 * | 12/2017 | Valois | G05D 1/021 |
| 2006/0106530 | A1 * | 5/2006 | Horvitz | G08G 1/0104 |
| | | | | 340/933 |
| 2019/0101976 | A1 * | 4/2019 | Reichow | G01S 17/931 |
| 2020/0175720 | A1 * | 6/2020 | Hsu | H04N 13/156 |
| 2020/0284912 | A1 * | 9/2020 | Bush | G06V 20/56 |
| 2021/0088669 | A1 * | 3/2021 | Li | B60S 1/62 |
| 2023/0139100 | A1 * | 5/2023 | Johansson | B60W 30/095 |
| | | | | 701/45 |

* cited by examiner

Primary Examiner — Travis R Hunnings
(74) Attorney, Agent, or Firm — Pete Adams Law, PLLC

(57) ABSTRACT

A sensor device for vehicles is disclosed and includes a system with an electronic navigation sensor, a multi-spectral data sensor, a router for receiving data from each sensor, a communications device connected to the router for communicating data, and a computer processor. The computer processor is used to receive data from each sensor, store real time data from each sensor, and store a master data sequence file of data previously collected from the same operating track. The sensor device has software on the computer processor which is programmed to correlate data from the sensors with data from a master data sequence file for the given track, make inferences based on data about an event, and communicate alarms as programmed.

6 Claims, 4 Drawing Sheets

SENSOR DEVICE FOR VEHICLES

BACKGROUND OF THE INVENTION

(1) Field of the Invention

The present invention relates to a sensor device for vehicles, including rail, automotive, trucking, coaches (buses), shipping, ferries and the like. The sensor array can be mounted in a number of ways, including for example, as a roof fitting, a front-mounted forward-looking fitting, or as a bumper bar type fitting. The sensor device assists the driver of the vehicle to make decisions.

(2) Description of Related Art

Most transportation fleets consist of existing vehicles that are designed to be operated by humans. A problem with humans for example, is that they are limited as to where they can drive, how far or for how long they can drive, and they are easily distracted. Any operating incidents require an investigation of the impact to the vehicle and an interview with the driver. There are video sensors which can record footage of journeys so that incidents can be replayed. However, those sensors cannot stop incidents from occurring.

The object of the invention is to provide a sensor device which can be retrofitted to existing transportation vehicles to provide increased situational awareness to the driver who can then act to mitigate the developing situation, for example by braking hard to a stop.

SUMMARY OF THE INVENTION

According to the present invention, there is a provided a sensor device for vehicles, the system comprising:
(a) an electronic navigation sensor;
(b) a multi-spectral data sensor;
(c) a router for receiving data from each sensor;
(d) a communications device connected to the router for communicating data;
(e) software for a computer processor programmed to:
  i. correlate data from the sensors with data from a master data sequence file;
  ii. make inferences based on sensor data about an event; and
  iii. communicate alarms as programmed; and
(f) an environmentally protective encasement for the sensor device.

The encasement preferably includes a visor hood to protect the encasement from solar radiation. More preferably, the encasement has an outwardly facing glass panel to increase strength and deflect objects. It is also preferred that the sloping glass panel has glass inserts adapted for the spectrum of each sensor. Glass inserts can be made with various chemical coatings to reflect some wavelengths of light and absorb other wavelengths. As a non-limiting example, an infrared glass insert placed over an infrared camera can be adapted to absorb infrared wavelengths of approximately 700 nanometers (nm)-1 millimeter (mm). Whereas the wavelength range of light visible to the human eye is approximately 400-700 nm. The encasement preferably keeps a record of when the sensor device has been opened.

Any of the features described herein can be combined in any combination with any one or more of the other features described herein within the scope of the invention.

BRIEF DESCRIPTION OF DRAWINGS

Various embodiments of the invention will be described with reference to the following drawings, in which.

DETAILED DESCRIPTION OF THE INVENTION

Figure 1:
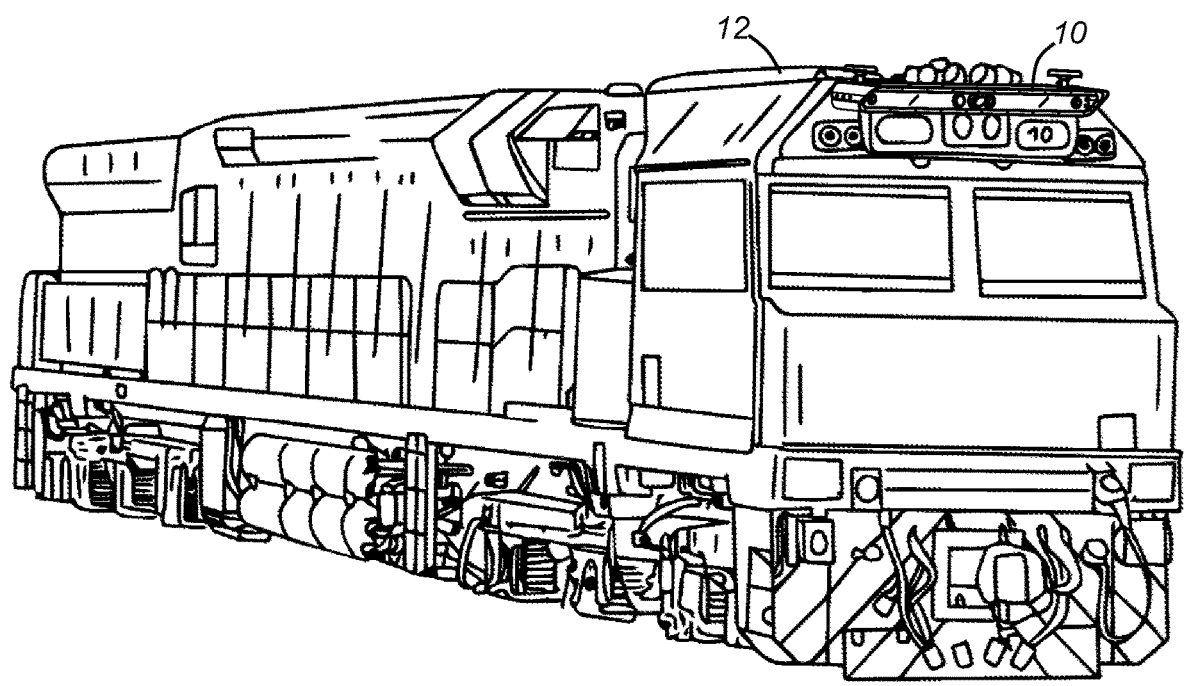
FIG. 1 is a perspective view of a sensor device according to an embodiment of the present invention on top of a freight locomotive.

FIG. 1 shows a sensor device 10 on the front of a locomotive 12, although the sensor device 10 can be used on any form of vehicle. The sensor device 10 is used to assist the driver of the locomotive 12 to make driving decisions.

Figure 2:
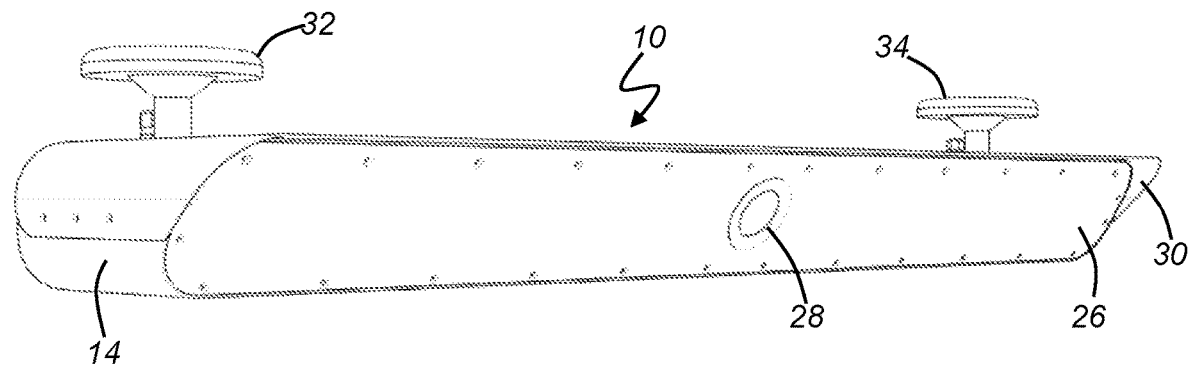
FIG. 2 is a perspective view of the sensor device of FIG. 1.
Figure 3:
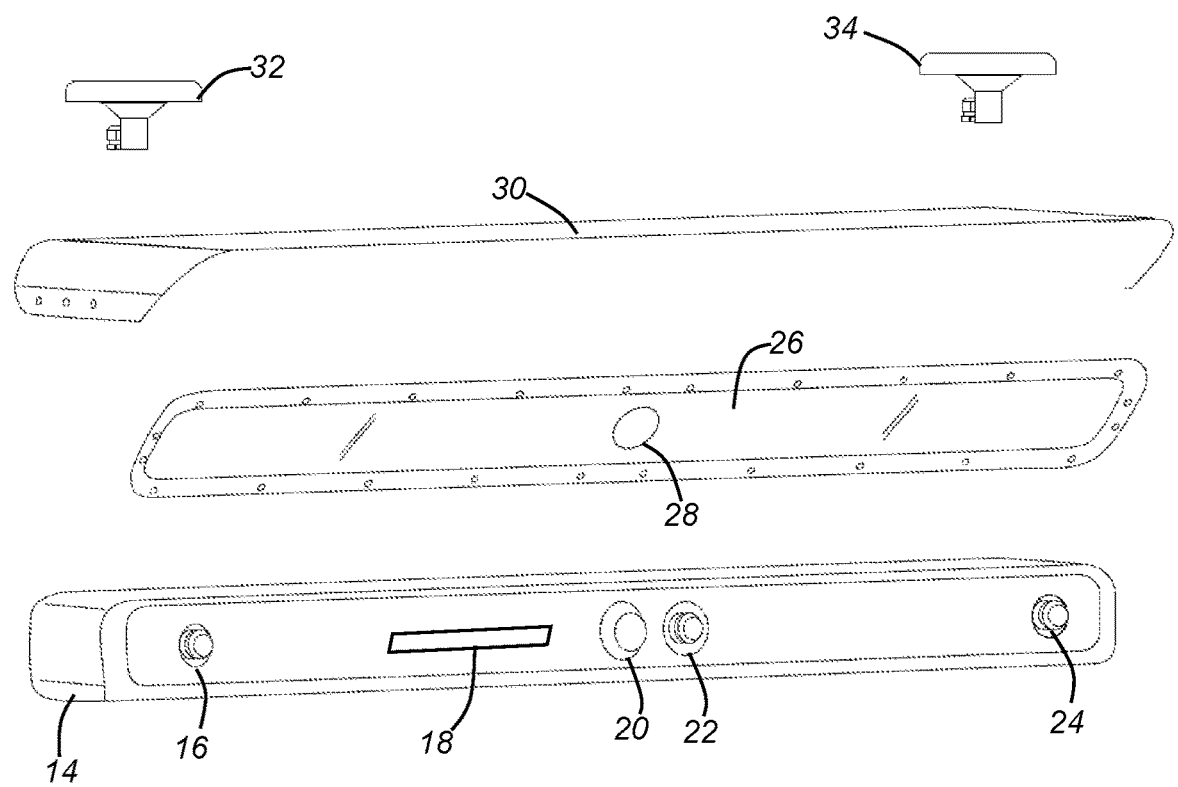
FIG. 3 is an exploded view of the sensor device of FIG. 1.
Figure 4:
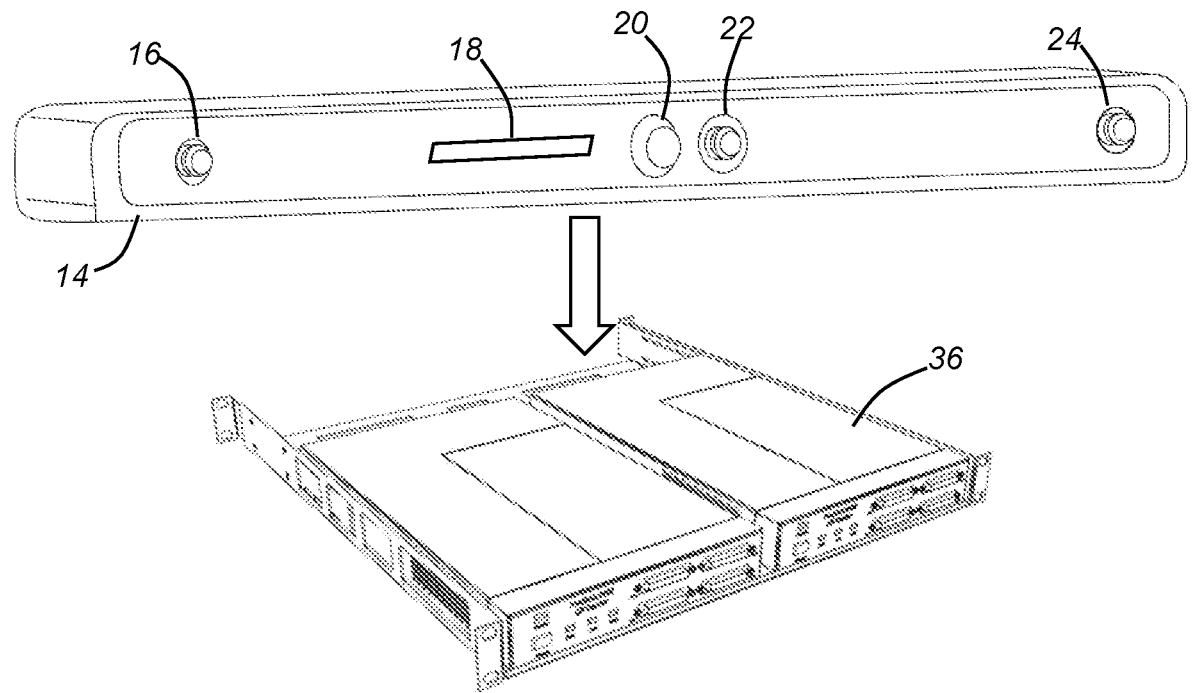
FIG. 4 is a conceptual representation of the operational components of the sensor device of FIG. 1.
Figure 5:
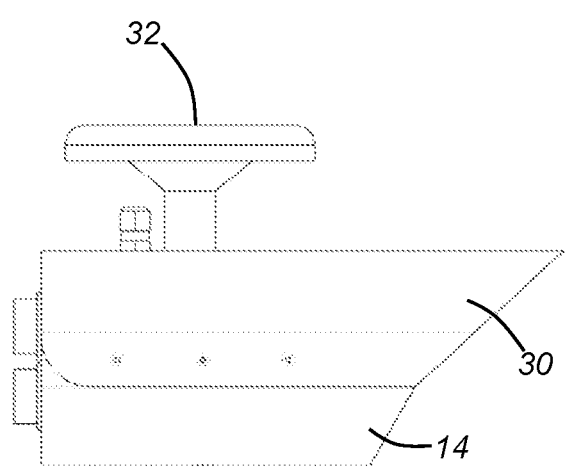
FIG. 5 is a right side view of the sensor device of FIG. 1.
Figure 6:
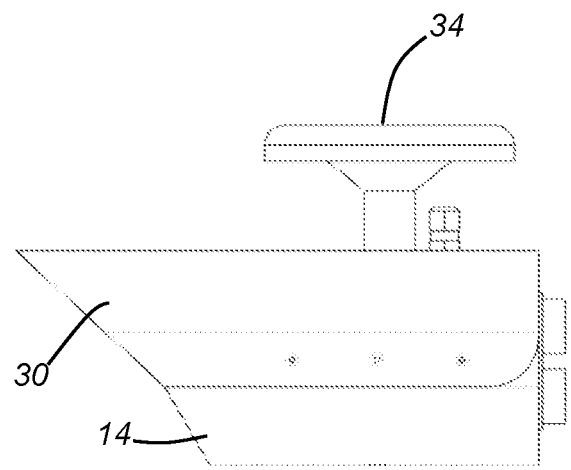
FIG. 6 is a left side view of the sensor device of FIG. 1.
Figure 7:
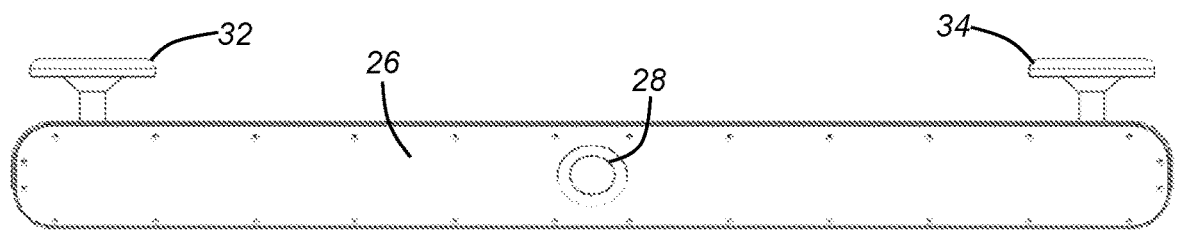
FIG. 7 is a front view of the sensor device of FIG. 1.
Figure 8:
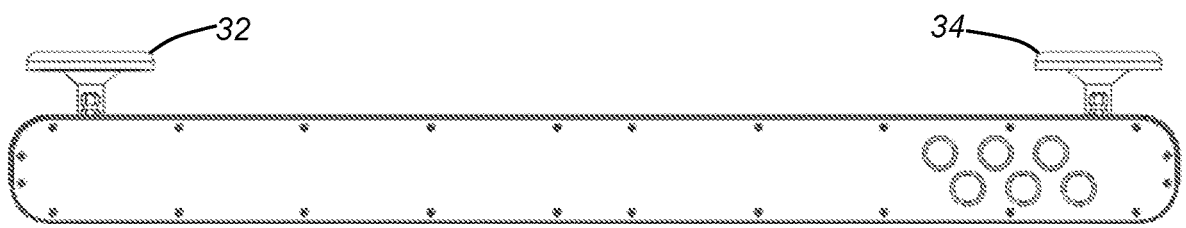
FIG. 8 is a rear view of the sensor device of FIG. 1.
Figure 9:
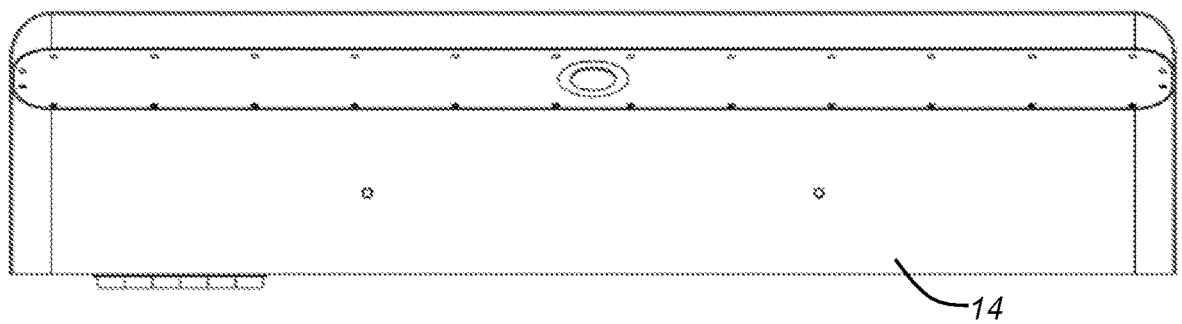
FIG. 9 is a bottom view of the sensor device of FIG. 1.
Figure 10:
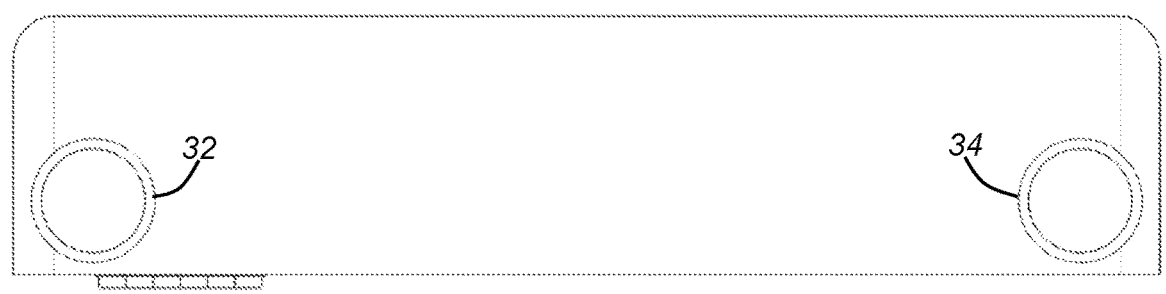
FIG. 10 is a top view of the sensor device of FIG. 1.

A close-up view of the sensor device 10 is shown in FIG. 2 and an exploded view of its components is shown in FIG. 3. The sensor device 10 has an encasement 14 and a sensor array. The sensor array comprises a first RGB camera 16, a lidar detector 18, a telephoto lens camera 20, an infra-red camera 22 and a second RGB camera 24.

The encasement 14 provides a substantial contribution to the working of the invention because it allows a sensor system to be economically and quickly retrofitted to an existing locomotive, rather than having to entirely replace the existing locomotive with a new locomotive at great expense. In other words, it is cheaper to give a train eyes than a new head.

The lidar detector 18 measures distances by illuminating a target with laser light and measuring the reflection with a sensor. Differences in laser return times and wavelengths can then be used to make digital 3D representations of the target.

The two RGB cameras 16 and 24 provide the sensor device 10 with stereoscopic vision. This enables the sensor device 10 to perceive distance and angle. It also enables the sensor device 10 to appreciate the centre line of the locomotive 10. For example, if there is a post along side the track of the locomotive 12, the stereoscopic cameras 16 and 24 can calculate the distance and location of that post from the locomotive 12.

The encasement 14 has a glass shield 26 which protects the sensor array from wind, rain and debris. The glass shield 26 is sloped outwardly to increase its deflection ability and strength. The glass shield 26 has a gallium arsenide insert 28 that enables infrared wavelengths of light to penetrate the glass shield 26 and be detected by the infra-red camera 22. The encasement 14 has a visor hood 30 that deflects solar radiation. The sensor device 10 also has two antennas 32 and 34 that receive GPS signals for location processing.

Each antenna housing contains an inertial navigation sensor (INS). The INS is a navigation device that uses motion sensors (accelerometers) and rotation sensors (gyroscopes) to continuously calculate by dead reckoning the position, orientation, and velocity (direction and speed of movement) of a moving object without the need for continuous external references. The GPS signal is used as an external reference to the INS processor which is why they are in the same mounting. If GPS is lost (e.g., in a tunnel), then the INS acts by dead reckoning through the tunnel until a reference GPS signal becomes available again. INS loses accuracy over time and does need an external reference to be continuously reset in case a GPS outage occurs.

In some embodiments of the invention, the sensor device 10 may also include a barometric altimeter, magnetic sensors (magnetometers), and/or speed measuring devices.

Data from the sensor array and antennas is transmitted through a router (namely, a Power over Ethernet switch) to a computer processor 36 that is located in an equipment rack (not shown) within the locomotive 12. The sensor device 10 may have a radio communications antenna (not shown) for transmitting data to remote third parties.

The computer processor 36 is programmed to receive data from the sensor array, store real time data from the sensor array, and store a master data sequence file of data previously collected from the sensors. The computer processor 36 has software which is programmed to correlate data from the sensor array with data from the master data sequence file, make inferences based on data about an event, and communicate alarms as programmed.

The master data sequence file comprises processed data extracted from previous runs from all locomotives operating on that particular track. The data is processed data. It is not video. Artefacts are extracted from previous runs are sorted as a sequence of objects, events and conditions. The computer processor 36 is looking for the differences between what artifacts the sensors are sensing and what was recorded in the master data sequence file. The computer processor 36 is programmed to look for particular differences between the incoming data and the master data sequence file which may indicate an alarm condition. This may include, for example, an unexpected item such as a cow or a car on the track ahead. The alarm can include a warning for the driver to apply the brakes on the locomotive 12.

The alarms can also be relayed electronically via the communications device to remote third parties so that they are aware of the event which could also present danger to them or the wider network. For example, a sensor device could make a rail network aware of cows on a particular section of track.

Each access panel of the sensor device 10 may have a sensor switch which is capable of detecting when the access panel has been opened or removed as an intrusion alarm. This detection helps to prevent tampering by a third party. An alarm may also be activated to a remote third party via the communications device. These alarms will not be activated to a driver as the device is not accessible to an intruder while the train is operating.

In the present specification and claims (if any), the word 'comprising' and its derivatives including 'comprises' and 'comprise' include each of the stated integers but does not exclude the inclusion of one or more further integers.

The appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A sensor device for an operator of a vehicles on a track, the device comprising:
    (a) an electronic navigation sensor;
    (b) a sensor array includes at least two multi-spectral data sensors for sensing the distance to objects on the track;
    (c) the sensor array further includes a first Red-Green-Blue (RGB) camera and a second RGB camera for providing the sensor device with stereoscopic vision, enabling the sensor device to perceive distance and angle;
    (d) the sensor array further includes a lidar detector for measuring distances by illuminating an object with laser light and measuring the reflection;
    (e) a router for receiving data from each sensor;
    (f) a communications device connected to the router for communicating data;
    (g) a radio communications antenna for transmitting data to remote third parties;
    (h) software for a computer processor programmed to:
        i. catalogue a database of objects on the track;
        ii. calculate the distance of the vehicle to objects on the track using the sensors;
        iii. process sensor data about the track ahead of the vehicle for variations from the database;
        iv. add data from each sensor to the database;
        v. make inferences about objects based on sensor data;
        vi. make digital three-dimensional representations of the object based on differences in laser return times and wavelengths measured by the lidar detector;
        vii. communicate alarms to the operator of the vehicle;
        viii. communicate alarms to remote third parties by transmitting data via the radio communications antenna; and
    (i) an environmentally protective encasement for the sensor device.

2. The sensor device of claim 1, wherein the encasement has a visor hood to protect the encasement from solar radiation.

3. The sensor device of claim 1, wherein the encasement has an outwardly facing glass panel to increase strength and deflect objects.

4. The sensor device of claim 1, wherein the glass panel is sloping and has glass inserts appropriate for the spectrum of each sensor.

5. The sensor device of claim 1, wherein the encasement detects when the sensor device has been opened.

6. The sensor device of claim 1, further comprising:
    (a) an access panel;
    (b) the access panel includes a sensor switch capable of detecting when the access panel has been opened or removed;
    (c) wherein the software for a computer processor is further programmed to: communicate an alarm to a remote third party when the access panel has been opened or removed.

* * * * *